(12) United States Patent
Gutteridge

(10) Patent No.: US 6,332,559 B1
(45) Date of Patent: Dec. 25, 2001

(54) LIQUOR DISPENSING APPARATUS

(75) Inventor: Lancelot P. Gutteridge, Craigie (AU)

(73) Assignee: Ekolink PTY LTD (AU)

( * ) Notice: Subject to any disclaimer, the term of this patent is extended or adjusted under 35 U.S.C. 154(b) by 0 days.

(21) Appl. No.: 09/529,595

(22) PCT Filed: Oct. 15, 1997

(86) PCT No.: PCT/AU97/00693
§ 371 Date: Aug. 14, 2000
§ 102(e) Date: Aug. 14, 2000

(87) PCT Pub. No.: WO98/16459
PCT Pub. Date: Apr. 23, 1998

(51) Int. Cl.[7] .................................................. B67D 5/14
(52) U.S. Cl. .............................. 222/61; 222/61; 222/64; 222/65
(58) Field of Search ................................. 222/53, 61, 64, 222/65, 67, 68

(56) References Cited

U.S. PATENT DOCUMENTS

| | | | |
|---|---|---|---|
| 4,106,671 | * | 8/1978 | Sharples ................................. 222/61 |
| 4,580,699 | * | 4/1986 | Black et al. ............................ 222/64 |
| 5,012,955 | * | 5/1991 | Shannon ................................ 222/61 |
| 5,145,092 | * | 9/1992 | Shannon ................................ 222/61 |
| 5,551,309 | | 9/1996 | Goossens et al. . |
| 5,556,002 | * | 9/1996 | Green ................................. 222/61 X |
| 5,632,960 | * | 5/1997 | Ferri, Jr. et al. .................... 422/106 |

FOREIGN PATENT DOCUMENTS

| | | |
|---|---|---|
| 48739/79 | 1/1980 | (AU) . |
| 0 477 811 | 4/1992 | (EP) . |
| 2 173 172 | 10/1986 | (GB) . |
| 2 260 965 | 5/1993 | (GB) . |

OTHER PUBLICATIONS

Derwent abstract accession No. 85/234933/38, Class Q39 SU, 1142435, A (Kievtorgmash Combin) Feb. 28, 1985—Abstract.

* cited by examiner

Primary Examiner—Kenneth Bomberg
(74) Attorney, Agent, or Firm—Larson & Taylor, PLC

(57) ABSTRACT

A liquor dispensing apparatus is provided for accurately dispensing a standard volume of a liquor, such as a spirit. The apparatus includes a metering reservoir having an air inlet, a liquor inlet and a liquor outlet. A plurality of level sensors are provided in a side wall of a reservoir for sensing the level of liquor remaining in a chamber of the reservoir. Compressed air, which enters chamber via air inlet, is used to discharge liquor from the reservoir through liquor outlet. A controller controls the discharge of liquor from the chamber and the refilling of the chamber in response to sensing signals from the level sensors. Solenoid valves control the flow of compressed air and liquor into/from the reservoir under the control of controller. Advantages include few moving parts, low maintenance and low manufacturing costs.

12 Claims, 2 Drawing Sheets

LIQUOR DISPENSING APPARATUS

FIELD OF THE INVENTION

The present invention relates to a liquor dispensing apparatus and relates particularly, though not exclusively, to a spirit dispensing apparatus.

BACKGROUND TO THE INVENTION

In the hospitality industry generally, and in hotels particularly, the ability to prepare spirit drinks, either mixed or straight, quickly and accurately is very important from a customer service point of view. Furthermore, in each State of Australia the sale of liquor is closely regulated by the Liquor Licensing Authorities and any establishment operating a bar service must comply with stringent requirements in relation to the dispensing of spirits and other liquors. In this connection, a standard shot of spirits in Australia is 30 milliliters, a half-shot is 15 milliliters and a double is 60 milliliters in volume. According to the Australian National Standards Commission any machine for the automatic dispensing of spirits must be sufficiently accurate to consistently dispense spirits with the following error margins:

15 ml ±0.6 ml
30 ml ±1.0 ml
60 ml ±1.5 ml.

Various types of automatic liquid dispensers are known in the prior art for dispensing a predetermined quantity of liquid. For example, WO 94/12427 discloses a liquid dispensing apparatus which employs a peristaltic pump for dispensing metered quantities of a liquid. A disadvantage of the apparatus of WO 94/12427 is the large number of moving parts and the consequent need for regular maintenance in view of the wear associated with the rotor and liquid transport lines of the peristaltic pump.

U.S. Pat. No. 5,316,181 discloses a liquid dispensing system having a liquid-filled reservoir, a controller microprocessor and a plurality of selectable outlets connected to the reservoir. A liquid level sensor provided within the reservoir is movable between a high position and a low position. The level sensor is used to provide an appropriate signal to the controller regarding the volume of liquid remaining in the reservoir. Metering of liquid from a selected outlet is controlled by the controller providing a signal to a selected valve at the end of a predetermined time period to close the valve. The time period together with the known rate of flow of liquid through the valve allows a specific amount of liquid to be dispensed. A difficulty with this method of metering liquid is that it requires an accurate measure and control of the flow rate of liquid through the system. This is only possible with expensive flow meters and/or complicated control systems.

SUMMARY OF THE INVENTION

The present invention was developed with a view to providing a liquor dispensing apparatus having minimum moving parts and which is relatively inexpensive to manufacture.

According to the present invention there is provided a liquor dispensing apparatus comprising:

a metering reservoir having an air inlet, a liquor inlet and a liquor outlet provided therein, said air inlet being provided in an upper region of the reservoir and said liquor outlet being provided in a lower region of the reservoir wherein, in use, air supplied under pressure to the air inlet is used to force liquor to be discharged from the reservoir via said liquor outlet;

a plurality of level sensors provided in the reservoir for sensing the level of liquor remaining in the reservoir, including a first sensor for sensing when the volume of liquor in the reservoir is at a first level, and a second sensor for sensing when the volume of liquor in the reservoir has fallen to a second level, wherein there is a predetermined difference in volume between the first and second levels;

controller means for controlling the discharge of liquor via the liquor outlet in response to sensing signals from said first and second sensors respectively whereby, in use, an accurately metered quantity of alcoholic liquor is dispensed; and a first control valve connected to the air inlet for controlling the supply of compressed air to the reservoir in response to a control signal from said controller means, and wherein said first control valve is provided with an air outlet communicating with the air inlet of the reservoir, an air intake communicating with a source of compressed air and an air exhaust communicating with atmosphere, said first control valve having two modes of operation, namely a refilling mode in which air escaping from within the reservoir via said air inlet is directed to atmosphere via said air exhaust, and a discharge mode in which compressed air entering said air intake is directed into the reservoir via said air inlet.

Preferably said first and second level sensors are mounted in a side wall of the reservoir at respective first and second heights corresponding to said first and second levels respectively. Preferably said level sensors are electro-optical sensors capable of sensing the level of liquor without having any electrical contact with the liquor.

Preferably said controller means also controls the intake of liquor through the liquor inlet in response to sensing signals from said first and second sensors respectively, whereby, in use, an accurately metered quantity of liquor is let into the reservoir through said liquor inlet.

Preferably said reservoir has an elongate metering chamber oriented in a generally upright manner, said air inlet being provided adjacent a top end of the chamber and said liquor outlet being provided adjacent a bottom end of the chamber. Preferably said liquor inlet is also provided adjacent the bottom end of the chamber. Typically said metering chamber is of cylindrical configuration.

Preferably said reservoir is one of a plurality of metering reservoirs provided in the apparatus, each reservoir being adapted to meter a different liquor.

BRIEF DESCRIPTION OF THE DRAWINGS

In order to facilitate a better understanding of the nature of the invention a preferred embodiment of the liquor dispensing apparatus will now be described in detail, by way of example only, with reference to the accompanying drawings in which.

DETAILED DESCRIPTION OF PREFERRED EMBODIMENT

Figure 1:
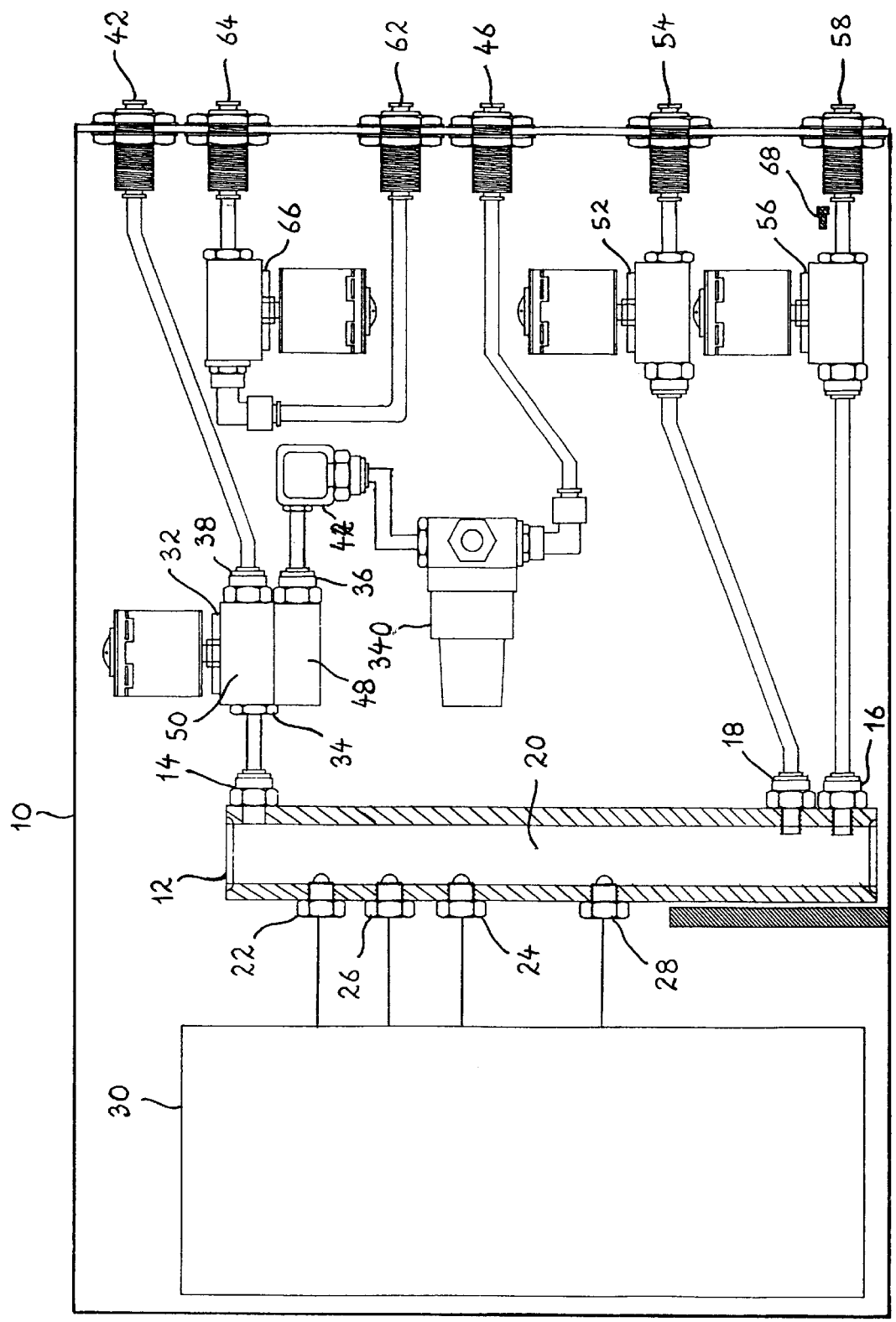
FIG. 1 illustrates in side elevation a preferred embodiment of the liquor dispensing apparatus according to the invention; and, FIG. 2 is a schematic diagram for the liquor dispensing apparatus of FIG. 1 showing all eight (8) liquor dispensing lines.
Figure 2:
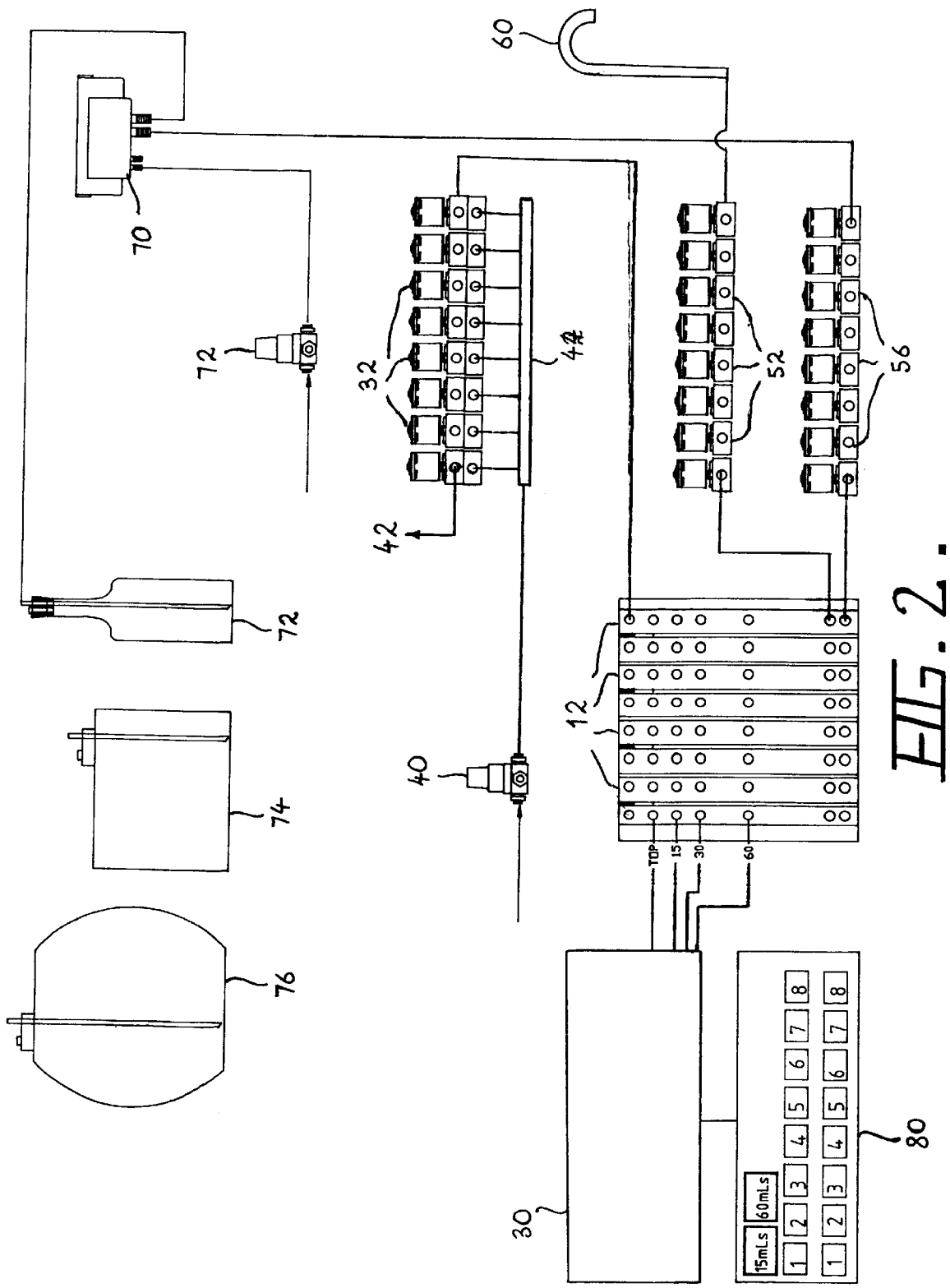

FIGS. 1 and 2 illustrate a preferred embodiment of a liquor dispensing apparatus in accordance with the present invention. FIG. 1 illustrates the arrangement of the components of the liquor dispensing apparatus mounted within a housing 10 shown in side elevation. For simplicity, the power supply and most of the electrical connections have been omitted from the drawings. Furthermore, as FIG. 1 illustrates the apparatus in side elevation, what is visible is effectively the arrangement of components for a single liquor dispensing line of the apparatus. This arrangement is effectively duplicated for all eight dispensing lines of the apparatus as shown schematically in FIG. 2.

Referring to FIG. 1, this embodiment of the liquor dispensing apparatus comprises a metering reservoir 12 having an air inlet 14, a liquor inlet 16 and a liquor outlet 18 provided therein. The reservoir 12 has an elongate metering chamber 20 oriented in a generally upright manner as shown in FIG. 1. The air inlet 14 is provided adjacent a top end of the chamber 20, and the liquor inlet 16 and liquor outlet 18 are provided adjacent a bottom end of the chamber 20. In this embodiment, the metering chamber 20 is of cylindrical configuration. In use, air supplied under pressure to the air inlet 14 can be used to force liquor within chamber 20 to be discharged from the reservoir 12 via the liquor outlet 18. As clearly visible in FIG. 2, reservoir 12 is one of a plurality of metering reservoirs provided in the apparatus, each reservoir being adapted to meter a different liquor. This embodiment of the liquor dispensing apparatus is adapted to dispense up to eight different brands or kinds of spirits. Hence, one reservoir 12 may be metering brandy, whereas another reservoir 12 may be metering whiskey. Each of the reservoirs 12 is preferably manufactured from thermoplastic material and is typically injection moulded so that the internal dimensions of chamber 20 remain constant from reservoir to reservoir. It is preferred that each reservoir be manufactured separately for ease of replacement and mass production.

However, if desired, a plurality of reservoirs may be manufactured as a single cylinder block. For example, a cylinder block may be manufactured from a block of Ertalyte plastic, in which eight holes are machined vertically in the block leaving one end closed. Into the side of the block and into each of the chambers five rows of smaller holes may be drilled. The top four holes are designed to accept electronic level sensors and the bottom row is machined to accept a tube connector. The sealed bottom of the cylinder block is also machined to accept tube connectors. The top of the cylinder block is machined to accept "O" ring seals and drilled and tapped to accept screws. A stainless steel plate machined to accept tube connectors is manufactured with the necessary screw holes to be screwed down on top of the block, thus sealing the chambers.

In the embodiments of FIGS. 1 and 2, each of the reservoirs 12 has a plurality of level sensors provided therein for sensing the level of liquor remaining in the reservoir 12. A first level sensor 22 senses when the volume of liquor in the chamber 20 is at a first level, and a second sensor 24 senses when the volume of liquor in the chamber has fallen to a second level. As clearly shown in FIG. 1, the first and second level sensors 22, 24 are mounted in a side wall of the reservoir 12 at respective first and second heights corresponding to the first and second levels respectively. There is a predetermined difference in volume of liquor within chamber 20 between the first and second levels. In this embodiment, the predetermined difference in volume has been set at 30 ml, corresponding to a standard nip of spirit.

A third sensor 26 located midway between the first and second sensors 22, 24 senses when the volume of liquor in chamber 20 has fallen to a third level. In this case, the predetermined difference in volume between the first and third levels is set at 15 ml, corresponding to a standard half nip. A fourth sensor 28 is mounted in the side wall of reservoir 12 for sensing when the volume of liquor in chamber 20 has fallen to a fourth level. The predetermined difference in volume between the first and fourth levels is 60 ml, corresponding to a standard double nip. It will be appreciated that the height and number of level sensors may be varied to suit the particular requirements of the end user of the liquor dispensing apparatus.

Any suitable liquid level sensor may be employed. Preferably the level sensors are electro-optical sensors capable of sensing the level of liquor within chamber 20 without having any electrical contact with the liquor. For example, the solid state liquid level sensors manufactured by Honeywell in England (Type 1, Catalogue List No. LL10100) are suitable. This type of level sensor has a transparent or translucent tip designed so that when it becomes wholly or partly submerged in liquid the transmission of light through the tip is altered sufficiently to cause a sensing signal to be generated to indicate the presence or absence of liquid.

A microprocessor-based controller 30 is provided within the housing 10 for controlling the discharge of liquor from the liquor outlet 18 in response to sensing signals from the level sensors so that an accurately metered quantity of liquor can be dispensed. The microprocessor of controller 30 can be programmed with an appropriate control algorithm for controlling the functions of the liquor dispensing apparatus. Those functions will become evident from the following description. Since a person skilled in the electronics arts can design a suitable controller once the desired functions are known, the design of the controller 30 will not be described herein.

A first electro-mechanical valve 32 is connected to the air inlet 14 of the reservoir 12 for controlling the supply of compressed air to chamber 20 in response to a control signal from controller 30. In this embodiment, the first electro-mechanical valve 32 is a double chamber solenoid valve having a single air outlet port on one side communicating with the air inlet 14 of the reservoir 12, and an air intake port and an air exhaust port on the other side. The air intake port communicates with a source of compressed air via an air pressure regulator 40. The air exhaust port 38 communicates with atmosphere via vent 42. In this embodiment, a single air pressure regulator 40 is employed to regulate the pressure of air supplied to each of the solenoid valves 32 to approximately 30 psi. As can be seen most clearly in FIG. 2, the air intake ports 36 of the solenoid valves 32 are connected to a common air manifold 44. Compressed air at up to 100 psi is supplied to the regulator 40 via air input 46 of the apparatus.

In the double chamber solenoid valve 42 a lower chamber 48 connected to air intake port 36 is normally closed. Solenoid valve 32 has two modes of operation. When solenoid valve 32 is deactivated in a refilling mode the lower chamber 48 will be closed and an upper chamber 50 will be open so that air escaping from within chamber 20 of reservoir 12 via the air inlet 14 is directed to atmosphere via the air exhaust port 38 and vent 42. When solenoid valve 32 is activated it is in a discharge mode in which compressed air entering the air intake port 36 is directed into the chamber 24 of reservoir 12 via the air outlet port 34 and air inlet 14 of reservoir 12. The double chamber solenoid valve 32 will be switched between the refilling mode and the discharge mode in accordance with control signals from controller 30 as described further below.

Controller 30 controls the discharge of liquor from the liquor outlet 18 of reservoir 12 using a second electro-mechanical valve 52. Valve 52 is also typically a solenoid valve having a single chamber which is normally closed. Hence, in order to allow spirits to be discharged via the liquor outlet 18 to the liquor output port 54 solenoid valve 52 must be activated to move the valve to the open position. Controller 30 also controls the intake of liquor via the liquor inlet 16 using a third electro-mechanical valve 56, which is a solenoid valve similar to valve 52. Hence, in order to take in spirits through the liquor input port 58 and liquor inlet 16, valve 56 must be activated to move it to the open position. Both the second and third solenoid valves 52, 56 are controlled by control signals from controller 30 in response to sensing signals from the level sensors 22, 24, 26 and 28 as will be described in more detail below.

Both the air solenoid valve 32 and the liquid solenoid valves 52, 56 are one of a bank of eight solenoid valves as clearly shown in FIG. 2, one for each of the liquor dispensing lines of the apparatus. The outlet ports of each of the second solenoid valves 52 are connected to respective liquor output ports 54, which are in turn connected to dispensing nozzle 60. Dispensing nozzle 60 is provided with 16 lines in known fashion, eight lines being connected to the liquor output ports 54 of the liquor dispensing apparatus, and the other eight lines being connected to a corresponding number of post-mix output ports 62 on the liquor dispensing apparatus (see FIG. 1). The liquor dispensing apparatus is also provided with a corresponding number of post-mix input ports 64. Between each of the post-mix input ports 64 and output ports 62 there is provided a fourth solenoid valve 66 which is also under the control of controller 30 and thus enables both the dispensing of liquor and the dispensing of post-mix to be controlled by the liquor dispensing apparatus. The post-mix input ports 64 are connected to the outlets of a conventional post-mix machine.

Spirits are supplied under pressure to each of the liquor input ports 58 from any product supply container using a suitable pump 70. In this embodiment, pump 70 is a pneumatically powered diaphragm pump of the kind manufactured and sold by Flojet Corporation, Irvine, Calif. under the trade mark FLOJET, which is also connected to the source of compressed air via air pressure regulator 72. Regulator 72 is set so that the pump 70 supplies the spirit to liquor input port 58 at a constant pressure of approximately 30 psi. The liquor may be pumped directly from a 2-liter bottle 74 as shown in FIG. 2. Alternatively, the liquor may be pumped from a 20-liter container 74 or any other bulk container such as drum 76. The pump 70 is not normally part of the liquor dispensing apparatus, and is preferably located as near as possible to the product supply source as the suction side of the pump is generally not particularly strong. Preferably a small sintered bronze filter 68 is provided between the liquor input port 58 and solenoid valve 56 in order to further control and regulate the flow of spirits into the reservoir 12. Filter 68 is shown external to the connecting line in FIG. 1 for clarity.

A keyboard 80 is operatively connected to the controller 30 to enable the user to specify the type and volume of spirit to be dispensed from the liquor dispensing apparatus. In this embodiment, keyboard 80 is provided with two rows of eight keys, the top row corresponding to eight lines for liquor dispensing and the bottom row corresponding to eight post-mix lines. The default volume for liquor dispensing is a standard nip or 30 ml. If a half nip (15 ml) or double nip (60 ml) is required, the corresponding button on keyboard 80 must first be depressed before pressing the desired product selection key.

The operation of the liquor dispensing apparatus under the control of controller 30 will now be described in detail.

Before the liquor dispensing apparatus can be used, it is necessary to prime each of the chambers 20 in reservoirs 12. Typically, controller 30 includes a sub-routine program for priming which activates each of the third solenoid valves 56 in turn to fill the respective chambers 20 with spirit up to the height of the first level sensor 22. Solenoid valve 32 remains deactivated so that air within chamber 20 is exhausted via air inlet 14 and air vent 42. When the level of liquor within chamber 20 reaches sensor 22 controller 30 deactivates solenoid valve 56 in response to a sensing signal from sensor 22. The apparatus is now primed and ready for use.

If the user wishes to dispense a standard nip of a particular spirit she simply presses the corresponding product key on keypad 80. Controller 30 will activate the corresponding air solenoid valve 32 so that compressed air from manifold 44 enters the top of chamber 20 via the air inlet 14. Controller 30 simultaneously activates the second solenoid valve 52 so that liquor can flow via liquor outlet 18 through the liquor output port 54 to nozzle 60. The pressure of the air within chamber 20 forces the liquor within chamber 20 out through liquor outlet 18 of the reservoir. When the level of liquor within chamber 20 falls to the level of sensor 24 controller 30 detects a sensing signal from sensor 24 and immediately deactivates both the air solenoid valve 32 and the liquid solenoid valve 52 so that no further liquor is dispensed from the output port 54.

Controller 30 then activates the corresponding third solenoid valve 56 to allow a fresh supply of liquor to be taken into the apparatus via liquor input port 58. Since the inlet port 14 of reservoir 12 is now vented to atmosphere via air vent 42, liquor enters the inlet 16 and refills the chamber 20 up to the level of the first sensor 22. The moment the level of liquid within chamber 20 reaches level sensor 22, controller 30 detects a sensing signal from the sensor 22 and deactivates solenoid valve 56. It is preferred that both the compressed air and the liquor supplied through liquor input port 58 be pressurised to approximately 30 psi in order to give rapid response times during both dispensing and refilling modes of the apparatus. However, if the pressure is too high then the liquid level may overshoot the level sensor before the corresponding solenoid valve closes.

If the operator wishes to dispense a half nip (15 ml) controller 30 follows substantially the same control process noted above, except that the sensing signal from level sensor 26 will be employed by controller 30 to deactivate the solenoid valve 32 when the level of spirit in chamber 20 falls to the height of the level sensor 26. The refilling operation is identical to that described above.

It will be appreciated that any required constant volume of liquor can be dispensed with the liquor dispensing apparatus by the judicious placement of the level sensors in the side wall of reservoir 12. The level sensors are located in the side wall as close as possible to the required height to achieve an accurate metering of the required volume. However, the apparatus can be further calibrated by introducing a time delay as small as one millionth of a second into the control signal from controller 30 for the solenoid valves 32, 52 and 56. By varying the time delay and hence the opening or closing time of the respective solenoid valve, fine adjustment of the total volume of liquor discharged from or taken into chamber 20 can be achieved.

Preferably, a long-life (Nicad) battery is provided within the apparatus which is constantly being recharged while the apparatus is switched on, to provide back-up power to the apparatus so that it can complete dispensing of the current measured dose in the event of power failure.

Now that a preferred embodiment of the liquor dispensing apparatus in accordance with the invention has been described in detail, it will be apparent that the apparatus has numerous advantages over the prior art, including the following:

(a) few moving parts leading to low maintenance and high reliability;

(b) rapid response in both discharging and refilling modes;

(c) accurate and repeatable dispensing of predetermined volumes of liquor with the possibility of fine adjustment during calibration;

(d) low power consumption;

(e) low cost electro-pneumatic control system.

Numerous variations and modifications will suggest themselves to persons skilled in the mechanical arts, in addition to those already described, without departing from the basic inventive concepts. For example, pneumatically-operated valves could be employed instead of solenoid valves for controlling the flow of air and liquor within the apparatus. All such variations and modifications are to be considered within the scope of the present invention, the nature of which is to be determined from the foregoing description and the appended claims.

The claims defining the invention are as follows:

1. A liquor dispensing apparatus comprising:

a metering reservoir having an air inlet, a liquor inlet and a liquor outlet provided therein, said air inlet being provided in an upper region of the reservoir and said liquor outlet being provided in a lower region of the reservoir wherein, in use, air supplied under pressure to the air inlet is used to force liquor to be discharged from the reservoir via said liquor outlet;

a plurality of level sensors provided in the reservoir for sensing the level of liquor remaining in the reservoir, including a first sensor for sensing when the volume of liquor in the reservoir is at a first level, and a second sensor for sensing when the volume of liquor in the reservoir has fallen to a second level, wherein there is a predetermined difference in volume between the first and second levels;

controller means for controlling the discharge of liquor via the liquor outlet in response to sensing signals from said level sensors whereby, in use, an accurately metered, discrete and predetermined quantity of alcoholic liquor is dispensed;

a first control valve connected to the air inlet for controlling the supply of compressed air to the reservoir in response to a control signal from said controller means, and wherein said first control valve is provided with an air outlet communicating with the air inlet of the reservoir, an air intake communicating with a source of compressed air and an air exhaust communicating with atmosphere, said first control valve having two modes of operation, namely a refilling mode in which air escaping from within the reservoir via said air inlet is directed to atmosphere via said air exhaust, and a discharge mode in which compressed air entering said air intake is directed into the reservoir via said air inlet; and a second control valve connected to the liquor outlet for dispensing of liquor from the reservoir in response to a control signal from said controller means.

2. A liquor dispensing apparatus as defined in claim 1, wherein said first and second level sensors are mounted on a side wall of the reservoir at respective first and second heights corresponding to said first and second levels respectively.

3. A liquor dispensing apparatus as defined in claim 2, wherein said level sensors are capable of sensing the level of liquor without having any physical contact with the liquor.

4. A liquor dispensing apparatus as defined in claim 1, wherein said controller means also controls the intake of liquor through the liquor inlet in response to sensing signals from said level sensors whereby, in use, liquor is let into the reservoir through said liquor inlet until the volume of liquor in the reservoir is at the first level.

5. A liquor dispensing apparatus as defined in claim 1, wherein said reservoir has an elongate metering chamber oriented in a generally upright manner, said air inlet being provided adjacent a top end of the chamber and said liquor outlet being provided adjacent a bottom end of the chamber.

6. A liquor dispensing apparatus as defined in claim 5, wherein said liquor inlet is also provided adjacent the bottom end of the chamber.

7. A liquor dispensing apparatus as defined in claim 6, wherein said metering chamber is of cylindrical configuration.

8. A liquor dispensing apparatus as defined in claim 1, wherein said reservoir is one of a plurality of metering reservoirs provided in the apparatus, each reservoir being adapted to meter a different liquor.

9. A liquor dispensing apparatus as defined in claim 8, wherein said apparatus includes a common air manifold for supplying compressed air to the air intakes of the first control valves for each of said plurality of reservoirs.

10. A liquor dispensing apparatus as defined in claim 9, wherein said apparatus further comprises a single air pressure regulator to regulate the pressure of air supplied to the common air manifold.

11. A liquor dispensing apparatus as defined in claim 1, wherein said apparatus further comprises a third control valve connected to the liquor inlet for controlling the supply of liquor to the reservoir in response to a control signal from said controller means.

12. A liquor dispensing apparatus as defined in claim 11, wherein said apparatus further comprises third and fourth sensors for sensing when the volume of liquor in the reservoir is at third and fourth levels respectively whereby, in use, any one of three discrete, predetermined and accurately metered quantities of liquor is dispensed.

* * * * *